US008694911B2

(12) United States Patent
Johnson

(10) Patent No.: US 8,694,911 B2
(45) Date of Patent: Apr. 8, 2014

(54) MANIPULATING HIDDEN DATA ENTRIES VIA REPRESENTATIVE MARKERS

(75) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/304,746

(22) Filed: Nov. 28, 2011

(65) Prior Publication Data
US 2013/0139099 A1    May 30, 2013

(51) Int. Cl.
*G06F 3/00*      (2006.01)
*G06F 3/048*    (2013.01)

(52) U.S. Cl.
USPC .......................................... 715/784; 715/762

(58) Field of Classification Search
USPC .................................................. 715/784, 762
See application file for complete search history.

(56) References Cited

U.S. PATENT DOCUMENTS

| | | | |
|---|---|---|---|
| 6,904,570 B2 | 6/2005 | Foote et al. | |
| 7,425,582 B2 * | 9/2008 | Baran et al. | 516/77 |
| 7,451,152 B2 * | 11/2008 | Kraft et al. | 1/1 |
| 7,467,350 B2 | 12/2008 | Aureglia et al. | |
| 7,631,255 B2 | 12/2009 | Weise et al. | |
| 7,788,584 B2 | 8/2010 | Kenna et al. | |
| 7,885,981 B2 * | 2/2011 | Kaufman et al. | 707/802 |
| 8,161,081 B2 * | 4/2012 | Kaufman et al. | 707/802 |
| 8,490,148 B2 * | 7/2013 | Sikka et al. | 726/1 |
| 2007/0300185 A1 * | 12/2007 | Macbeth et al. | 715/825 |
| 2008/0034317 A1 * | 2/2008 | Fard et al. | 715/781 |
| 2008/0313650 A1 * | 12/2008 | Arnquist et al. | 719/316 |
| 2009/0112924 A1 * | 4/2009 | Harris et al. | 707/103 X |
| 2009/0260022 A1 * | 10/2009 | Louch et al. | 719/328 |
| 2009/0276691 A1 | 11/2009 | Galuten | |
| 2009/0288026 A1 | 11/2009 | Barabas et al. | |
| 2010/0184468 A1 | 7/2010 | Lapstun et al. | |
| 2013/0120439 A1 * | 5/2013 | Harris et al. | 345/619 |
| 2013/0139099 A1 * | 5/2013 | Johnson | 715/784 |

OTHER PUBLICATIONS

Anuradha et al. "A Novel Technique for Data Extraction from Hidden Web Databases" International Journal of Computer Applications (0975-8887), vol. 15, No. 4, pp. 45-48, Feb. 2011.
The Eclipse Foundation. "Eclipse Memory Analyzer (MAT)" Date printed Aug. 18, 2011 <http://www.eclipse.org/mat/>, Copyright 2011.

* cited by examiner

*Primary Examiner* — David Phantana Angkool
(74) *Attorney, Agent, or Firm* — Jason H. Sosa

(57) ABSTRACT

A tool for manipulating data entries that cannot be visualized in a user interface. A user interface displays a plurality of data entries that fit in the user interface, where the plurality of data entries are from a larger group of data entries. The tool generates and displays a marker (text line or icon) representative of at least a subset of the remainder of data entries from the larger group. A user directing an operation request to the marker causes the operation to be performed on the data entries represented by the marker.

23 Claims, 6 Drawing Sheets

```
public final IStructuredSelection getSelection()
{
   Item[] items = adapter.getSelection();
   if (items.length == 0)
      return StructuredSelection.EMPTY;

List<Object> selection = new ArrayList<Object>(items.length);
   for (int ii = 0; ii < items.length; ii++)
   {
      Object row = items[ii].getData();
      if (row != null)
         selection.add(row);
      else
      {
         // Expand a totals row into all remaining objects
         final Item parent = adapter.getParentItem(items[ii]);
         ControlItem ctrl = null;
         if (parent == null)
         {
            // Exclude the filter row
            if (adapter.indexOf(items[ii]) != 0)
            {
               ctrl = (ControlItem) control.getData(Key.CONTROL);
            }
         }
         else
         {
            // Subtree, so no filter row
            ctrl = (ControlItem) parent.getData(Key.CONTROL);
         }
         if (ctrl != null && ctrl.getTotals() != null && items[ii].getText() != null
                  && items[ii].getText().length() != 0)
         {
            // Add all the undisplayed items to the list
            for (int jj = ctrl.getTotals().getVisibleItems(); jj < ctrl.children.size(); ++jj)
            {
               selection.add(ctrl.children.get(jj));
            }
         }
      }
   } return new StructuredSelection(selection);
}
```

FIG. 4

| File Edit View Help | | |
|---|---|---|
| Tree-view | HEAP ANALYZER ~502 | |
| Class Name | Shallow Heap | Retained Heap |
| class java.lang.System @ 0xc41f00 System Class | 1,501 | 148,893 |
| sun.misc.Launcher$AppClassLoader @ 0xc959a0 System Class | 104 | 33,032 |
| class java.io.File @ 0xc8dce0 System Class | 2,507 | 23,451 |
| long[2000] @ 0xca7418 | 16,016 | 16,016 |
| double[2000] @ 0xcad1f8 | 16,016 | 16,016 |
| class java.nio.charset.Charset @ 0xc61cc8 System Class | 1,101 | 14,589 |
| class sun.io.CharacterEncoding @ 0xc43758 System Class | 7,439 | 14,471 |
| class java.lang.String @ 0xc40360 System Class, JNI Global | 11,084 | 12,508 |
| class java.util.Arrays @ 0xcb34c8 System Class | 12,183 | 12,263 |
| class java.util.regex.Pattern @ 0xc9a240 System Class | 9,286 | 9,430 |
| class java.lang.Class @ 0xc400c0 System Class, JNI Global | 7,631 | 9,303 |
| class com.ibm.oti.vm.VM @ 0xc42918 System Class | 320 | 9,032 |
| class java.lang.J9VMInternals @ 0xc40020 System Class, JNI Global | 8,032 | 8,720 |
| class sun.nio.cs.StandardCharsets @ 0xc61d28 System Class | 1,838 | 8,670 |
| class java.util.TreeMap @ 0xcb3238 System Class | 8,083 | 8,083 |
| int[2000] @ 0xca54c8 | 8,016 | 8,016 |
| float[2000] @ 0xcab2a8 | 8,016 | 8,016 |
| class java.util.Locale @ 0xc46228 System Class | 2,301 | 7,613 |
| java.lang.Thread @ 0xc416c0 main Thread | 96 | 6,976 |
| class java.io.ObjectStreamClass @ 0xc91278 System Class | 6,143 | 6,159 |
| Total: 20 of 1,011 entries | | |

FIG. 5

MANIPULATING HIDDEN DATA ENTRIES VIA REPRESENTATIVE MARKERS

FIELD OF THE INVENTION

The present invention relates generally to the field of information processing by digital computers and more particularly to representation, selection, and operation of unseen or hidden data.

BACKGROUND OF THE INVENTION

Representational forms of data and data structures are often displayed to a user via a user interface. The forms of the data are "representational" in the sense that data is typically stored in various forms of memory as one or more series of binary signals in electrical and magnetic storage devices, but may be translated into characters (representations), often alphanumeric, comprehensible by users interacting with them. A data structure is a particular way of organizing and storing data in a computer so that it may be used efficiently. Common data structures include arrays, linked lists, tables (e.g., hash-tables), heaps, trees, stacks, and queues.

For example, a database typically takes advantage of a tree structure as databases are often administered in a hierarchical manner. Such a tree structure contains a number of (dominant) items, and each item may have an arbitrary number of (subordinate) items. Several interrelated items will typically be grouped under a single dominant item. Subordinate items may be dominant to and contain subordinate items of their own.

Data entries may be presented in the logical organization of a data structure, e.g., a visual list, a tree structure, a table, etc. When displayed in a user interface, large data structure representations can easily occupy a space spanning beyond the limits of the user interface, making them hard to visualize and even harder to manipulate via the user interface. A scrolling window can be used to show all the data entries but may be computationally expensive. Alternatively, at the end of the visible data entries within a user interface, a summation line or marker may be included indicating an amount of remaining non-visible or "hidden" data entries. Such a summation line may be expandable to display additional, previously non-visible, data entries that are often then subject to a scrolling window or visible in a separate view.

SUMMARY

Aspects of an embodiment of the present invention disclose a method, computer system, and computer program product for manipulating one or more of a group of data entries in a user interface. A computer displays a first subset of data entries, from the group of data entries, within a display window of the user interface, wherein the group of data entries contains more data entries than can fit within the display window. The computer determines that a second subset of data entries from the group of data entries will not fit within the display window of the user interface concurrently with the first subset of data entries. Responsive to determining that the second subset of data entries will not fit within the display window of the user interface concurrently with the first subset of data entries, the computer generates and displays a marker representative of the second subset of data entries, wherein the marker fits within the display window of the user interface concurrently with the first subset of data entries. The computer manipulates the data entries in the second subset of data entries based on an operation request directed at the marker representative of the second subset of data entries.

BRIEF DESCRIPTION OF THE SEVERAL VIEWS OF THE DRAWINGS

FIG. 4 illustrates a source code implementation for selecting data entries, visible and not visible, in the user interface as described in FIG. 3, in accordance with an embodiment of the present invention.

FIG. 5 depicts one embodiment of a user interface display.

DETAILED DESCRIPTION

Figure 1:
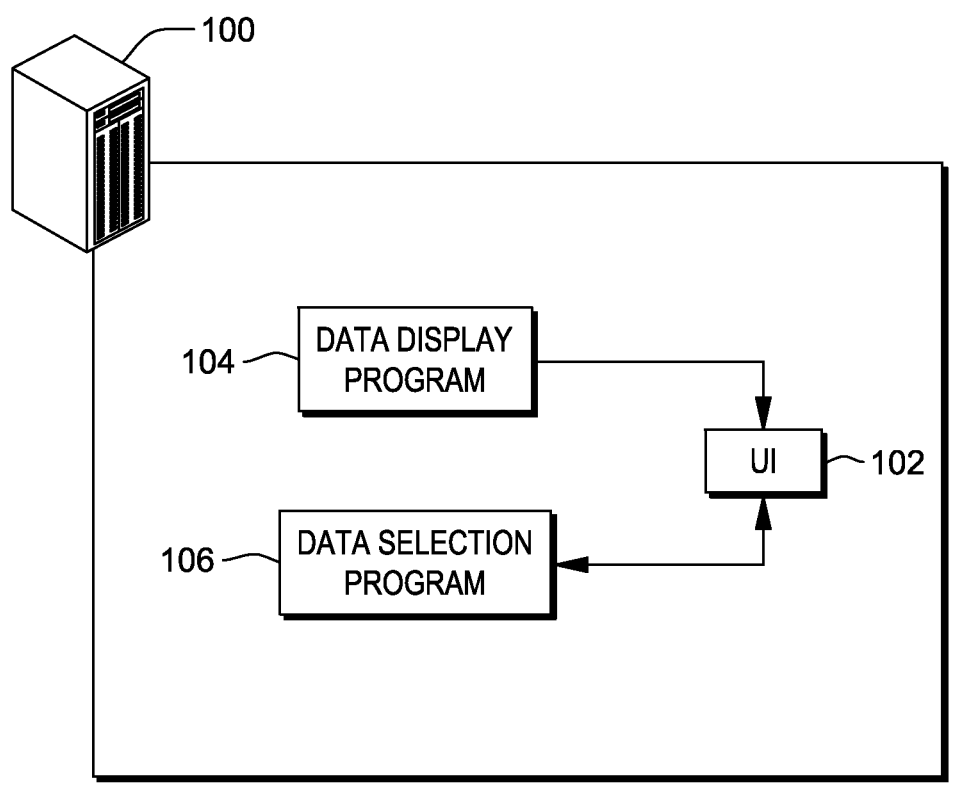
FIG. 1 is a block diagram of a data processing system according to an embodiment of the present invention.

The present invention will now be described in detail with reference to the Figures. FIG. 1 illustrates a data processing system, generally designated 100, according to one embodiment of the present invention.

Data processing system 100 may be a server computer, a client computer, a notebook, a laptop computer, a tablet computer, a handheld device or smart-phone, a thin client, or any other electronic device or computing system capable of receiving input from a user, performing computational operations, and displaying data. In another embodiment, data processing system 100 represents a computing system utilizing clustered computers and components to act as a single pool of seamless resources when accessed through a network. This is a common implementation for datacenters and for cloud computing applications.

Data processing system 100 contains user interface (UI) 102 for displaying data, user options, and instructions for operation, and may accept data input and option selections corresponding to data display program 104 and data selection program 106. UI 102 may be, for example, a graphical user interface (GUI) or a web user interface (WUI). Data processing system 100 executes data display program 104 for displaying at least a portion of a group of data entries in UI 102, where all the data entries in the group of data entries cannot concurrently display in the user interface. Data entries unable to display in UI 102 due to size limits are represented by data display program 104 via a marker or line signaling the hidden data's existence. The marker is preferably expandable to produce at least a portion of the hidden data. Data processing system 100 also executes data selection program 106 for selecting and manipulating data entries both visible and not visible in UI 102 without first expanding the marker representative of data entries not visible in the user interface.

Data processing system 100 can include internal and external components (depicted in FIG. 6) as described in more detail below.

Figure 2:
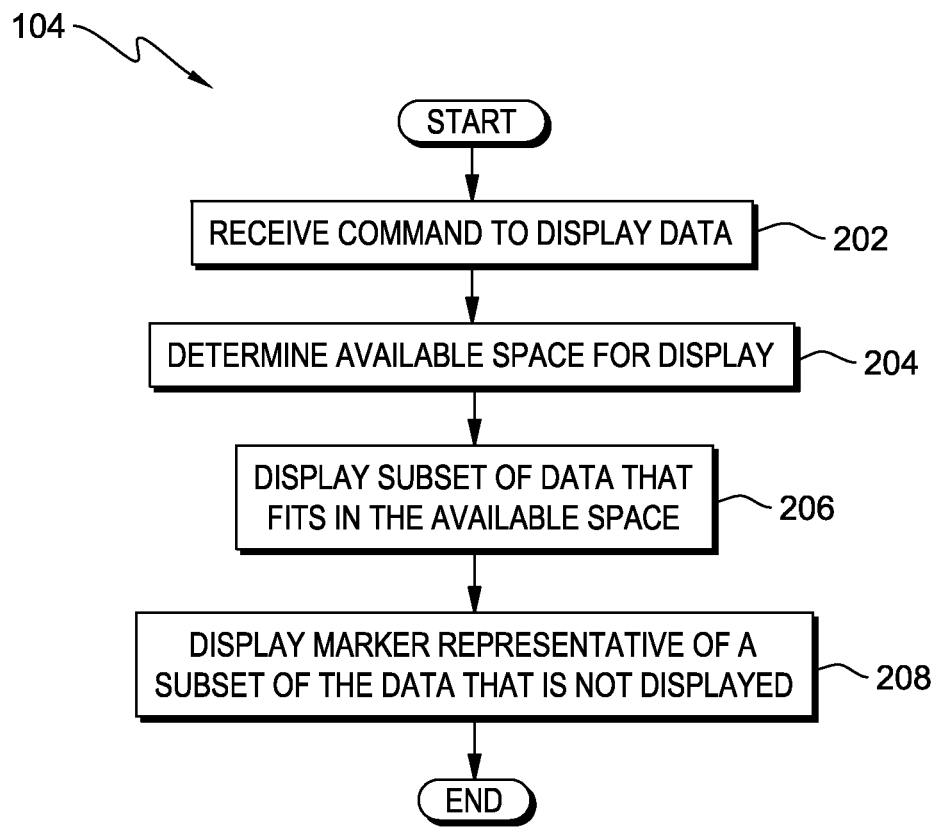
FIG. 2 is a flowchart of the steps of a data display program on the data processing system of FIG. 1, in accordance with an embodiment of the present invention.

FIG. 2 is a flowchart depicting the steps of data display program 104 for displaying at least a portion of a group of data entries in user interface 102 and a marker representative of at least a portion of the group of data entries not visible in the user interface, in accordance with an embodiment of the present invention.

Data display program 104 receives a command to display the group of data entries (step 202) in UI 102. Data entries may be displayed in organizational structures including lists, tables, trees, etc. In a preferred embodiment, the group of data entries is maintained in a database, and is organized and displayed as a tree structure.

Data display program 104 determines the available space for displaying data entries (step 204). Data display program 104 determines dimensions of a display window of UI 102 and dimensions of a font used for the character representation of the data entries. In one embodiment, both of these dimensions are predefined in a "default" setting but adjustable by a user. Based on the determined available space, data display program 104 displays a subset of the group of data entries that fits into the display window of UI 102 without exceeding boundaries of the display window (step 206). The display window of UI 102 may, in one embodiment, be a scrolling window, wherein the scrolling window does not scroll far enough to display all data entries.

Data display program 104 also displays a marker representative of at least a subset of data entries from the group of data entries not being displayed in UI 102 (step 208). In the preferred embodiment the marker is expandable to display the subset of the data entries not being displayed. In one example, after displaying the subset of the group of data entries that fits within UI 102, a summation line is displayed totaling the number of data entries displayed out of a total number of data entries in the group of data entries, e.g., "15 entries displayed of 67 total entries." The summation line is the marker representative of the subset of data entries not being displayed (the additional 52 entries). In the preferred embodiment, upon selecting the summation line, a user may select to display the additional 52 entries in a scrolling window.

In an alternative embodiment, a plurality of markers exists allowing the selection of various subsets of data entries not being displayed, e.g., "entries 15-30," "entries 30-45," etc, or "next 15 entries," etc. Additional data entries may be displayed in a scrolling window or in a separate view replacing the original displayed entries with the additional selected entries. In another embodiment, the marker is an icon. Any marker may be used so long as it can be understood by, or conveyed to, a user that data entries exist that should be grouped with the displayed data set and are unavailable in the current view. A person of ordinary skill in the art will recognize that markers may also represent not-displayed data entries within a subtree of a displayed data entry.

Figure 3:
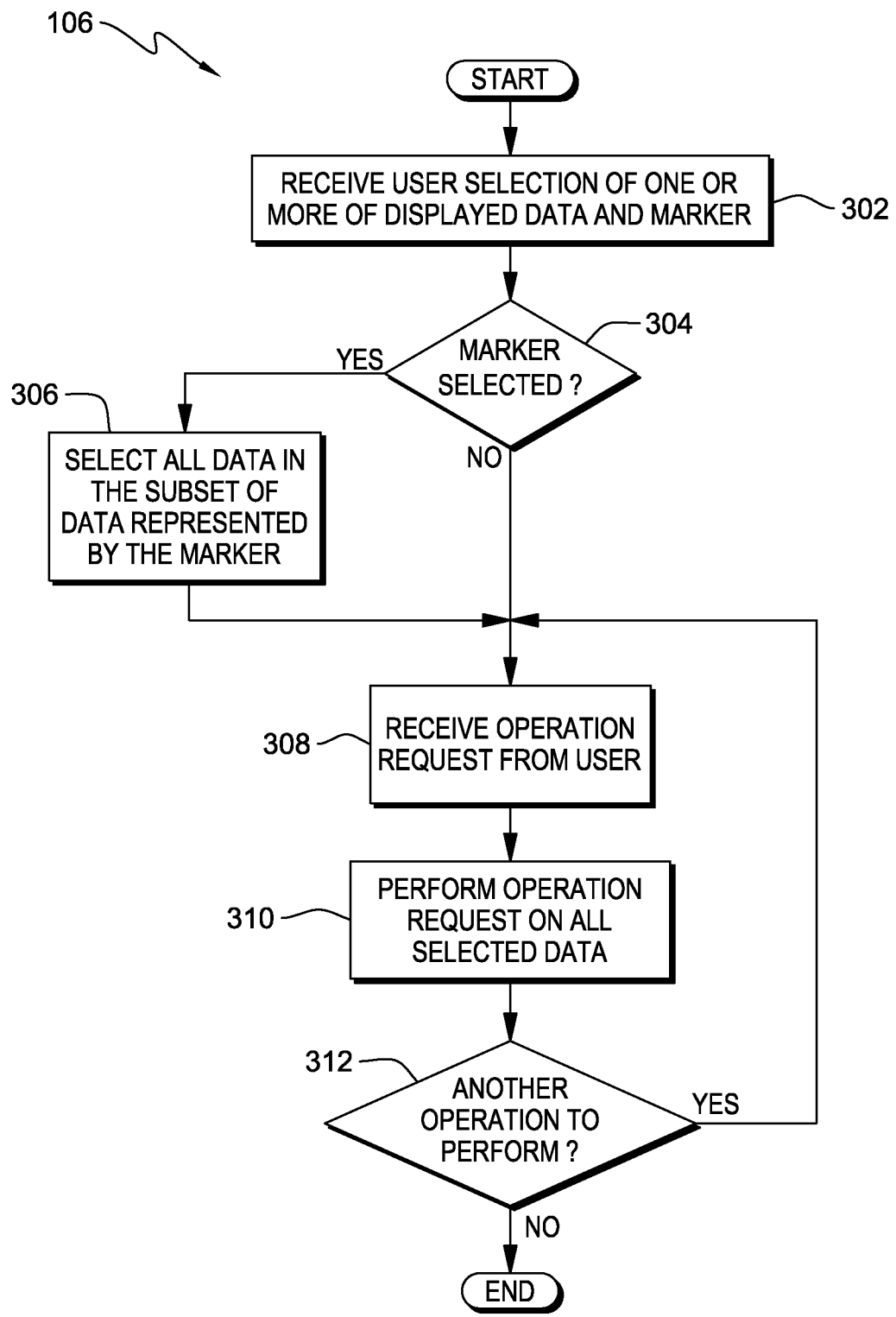
FIG. 3 is a flowchart of the steps of a data selection program on the data processing system of FIG. 1, in accordance with an embodiment of the present invention.

FIG. 3 is a flowchart depicting the steps of data selection program 106 for selecting and manipulating data entries both visible and not visible in UI 102 without first expanding the marker representative of the subset of data entries not visible in the user interface, in accordance with an embodiment of the present invention.

Subsequent to displaying data entries and the marker in UI 102, data selection program 106 receives a selection of one or more of the displayed data entries and the marker (step 302). Generally, a user selects displayed entries with a mouse pointer in UI 102. In the embodiment using a summation line, in addition to having the ability to select multiple displayed data entries, a user also has the ability to select the summation line. Data selection program 106 receives the user selections from UI 102.

Data selection program 106 determines if the marker is selected (decision block 304). If the marker is selected, data selection program 106 selects all data entries in the subset of data entries represented by the marker (step 306). In an alternative embodiment, if the marker is selected, data selection program 106 selects all the data entries in the group of data entries—preferably, de-selecting any duplicated data selections (e.g., entries selected from the displayed group in addition to the marker selection).

The selection of data entries represented by the marker is done without first having to expand and/or view the unseen data entries.

Subsequent to selecting the data entries in the subset of data entries represented by the marker, or alternatively subsequent to determining that the marker was not selected, data selection program 106 receives an operation request from the user (step 308) via UI 102. Exemplary operations include copying the data entries or performing mathematical operations on the data entries or a field of the data entries. The operation requested may also be a query. Exemplary queries include collecting or grouping the data entries by certain values or fields.

Data selection program 106 performs the requested operation on all selected data entries (step 310), which may now include "hidden" data unseen in the user interface. Performing the operation may include manipulating the data entries by altering, editing, moving, or using the data entries or respective fields of the data entries.

Data selection program 106 determines if another operation is to be performed (decision block 312), typically by identifying user instructions/selections at UI 102, and if there is another operation, returns to step 308 to receive the operation request from the user via UI 102. If there are no more operations to be performed, data selection program 106 ends.

FIG. 4 depicts an exemplary source code implementation of selecting visible and not visible data entries in UI 102 (collectively steps 302, 304 and 306 of data selection program 106) for subsequent manipulation.

FIG. 5 depicts one embodiment of a display of user interface 102, in accordance with an embodiment of the present invention. In the depicted embodiment, UI 102 is designed for a heap analyzer application, as indicated by interface header 502. Briefly, a heap is a region of free memory available while a program is executed, allowing for dynamic memory allocation. A heap analyzer has the functionality to read, display, and perform various diagnostic functions on a "snapshot" of a state of the heap memory, which generally includes all the live objects, arrays, and classes at the time of the snapshot. This snapshot is known in the art as a "heap memory dump," but will be referred to herein as a heap snapshot. A heap analyzer generally parses the heap snapshot, creating directional graphs, and transforming the graphs into directional trees. The directional trees can be quite large and if displayed, do not typically fit within a display window of a user interface. A summation line is often used to indicate the amount of information displayed out of a total amount of information contained in the directional tree. One such directional tree is displayed under the tree-view display tab 504.

Under tree-view display tab 504, live objects, arrays, and classes of an exemplary heap snapshot are displayed in a Class Name field, and corresponding fields 506 and 508 indicate each object's shallow heap size (field 506) (amount of memory used by the one object) and retained heap size (field 508) (amount of memory consumed by all objects kept alive the object).

Objects 510 are the objects that were able to be displayed within the boundaries of UI 102, out of a larger group of objects. Representative of the remainder of objects from the larger group of objects, summation line 512 displays a number of entries displayed out of a total number of entries—in the depicted example, 20 of 1,011. In an embodiment of the present invention, the selection of summation line 512 indicates that all objects in the entire larger group of objects are to be selected/used for subsequent operations requested. In an alternative embodiment of the present invention, the selection of summation line 512 indicates that the remainder of objects (the objects not displayed) from the larger group of objects are to be selected/used for subsequent operations requested.

Figure 6:
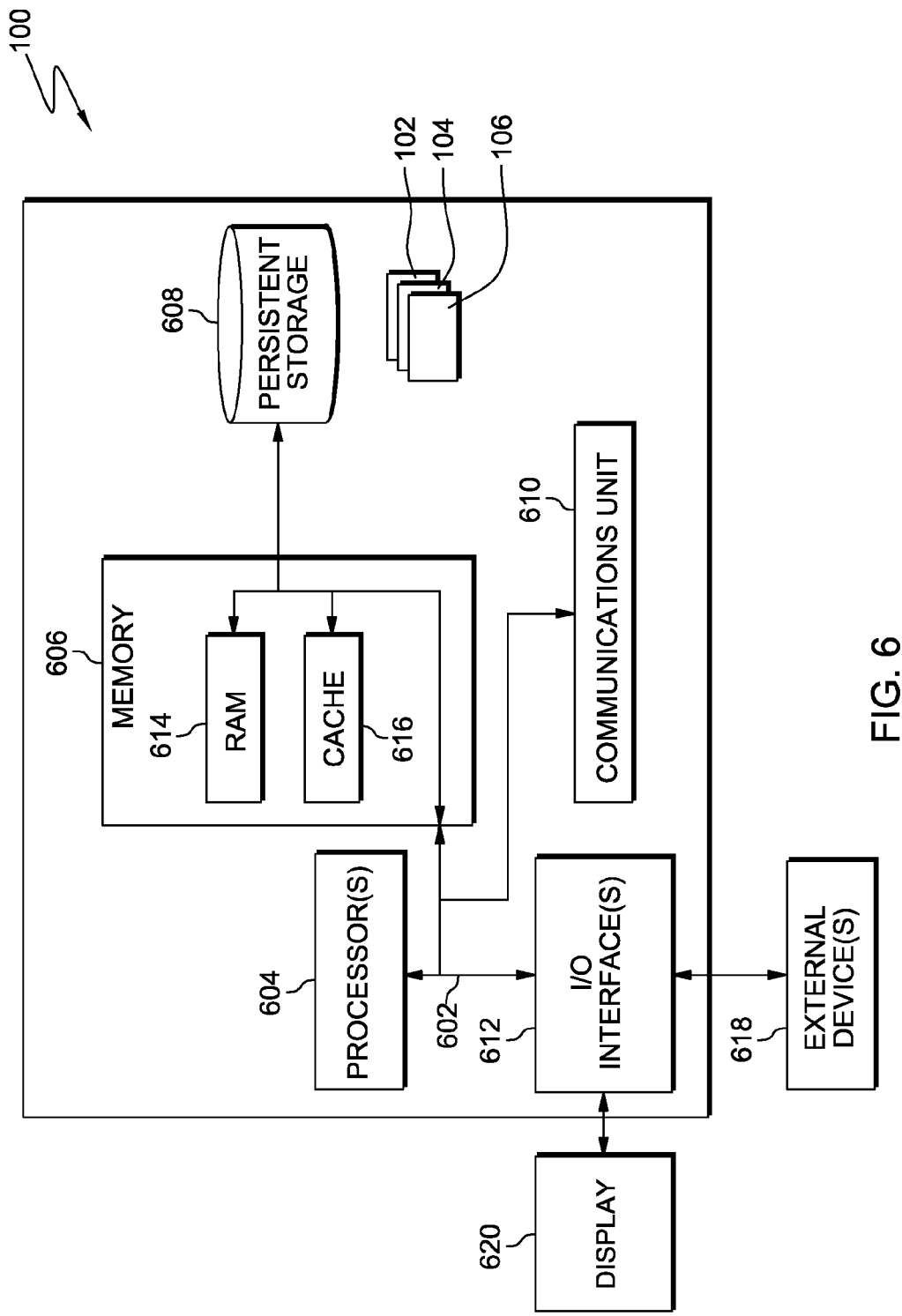
FIG. 6 depicts a block diagram of internal and external components of the data processing system of FIG. 1.

FIG. 6 depicts a block diagram of components of data processing system 100 in accordance with an illustrative embodiment. It should be appreciated that FIG. 6 provides only an illustration of one implementation and does not imply any limitations with regard to the environment in which different embodiments may be implemented. Many modifications to the depicted environment may be made.

Data processing system 100 includes communications fabric 602, which provides communications between processor(s) 604, memory 606, persistent storage 608, communications unit 610, and input/output (I/O) interface(s) 612.

Memory 606 and persistent storage 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device.

User interface 102, data display program 104, and data selection program 106 are stored in persistent storage 608 for execution by one or more of the respective processors 604 via one or more memories of memory 606. In the embodiment illustrated in FIG. 6, persistent storage 608 includes flash memory. Alternatively, or in addition to, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, data processing system 100 may be devoid of communications unit 610. UI 102, data display program 104, and data selection program 106 may be downloaded to persistent storage 608 through communications unit 610.

I/O interface(s) 612 allows for input and output of data with other devices that may be connected to data processing system 100. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for manipulating data not visible in a user interface, through the user interface. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method for manipulating one or more data entries from a group of data entries in a user interface, the method comprising:

a computer displaying a first subset of data entries from the group of data entries within a display window of the user interface, wherein the group of data entries contains more data entries than can fit within the display window;

the computer determining that a second subset of data entries from the group of data entries will not fit within the display window of the user interface concurrently with the first subset of data entries;

responsive to determining that the second subset of data entries will not fit within the display window of the user interface concurrently with the first subset of data entries, the computer generating and displaying a marker representative of the second subset of data entries, wherein the marker is displayed within the display window of the user interface with the first subset of data entries; and the computer manipulating the data entries in the second subset of data entries based on an operation request directed at the marker representative of the second subset of data entries.

2. The method of claim 1, wherein the second subset of data entries contains one or more data entries from the group of entries not included in the first subset of data entries.

3. The method of claim 1, wherein the second subset of data entries contains all data entries, from the group of data entries, not included in the first subset of data entries.

4. The method of claim 1, wherein the marker representative of the second subset of data entries is a line of text.

5. The method of claim 1, wherein the marker representative of the second subset of data entries of a graphical icon.

6. The method of claim 1, further comprising the computer manipulating the data entries in the first subset of data entries based on the operation request directed at the marker representative of the second subset of data entries.

7. The method of claim 1, wherein the step of the computer manipulating the data entries of the second subset comprises one or more of: the computer altering the data entries, the computer editing the data entries, the computer moving the data entries, the computer organizing the data entries, the computer using the data entries in a subsequent operation, the computer using respective fields within the data entries in a subsequent operation, and the computer using the data entries to determine a response to a query where the operation request directed at the marker is the query.

8. The method of claim 1, further comprising the computer determining that the operation request is directed at the marker by the computer receiving a selection of the marker from a user and the computer subsequently receiving the operation request from the user.

9. A computer program product for manipulating one or more data entries from a group of data entries in a user interface, the computer program product comprising:
- one or more computer-readable tangible storage devices and program instructions, for execution by one or more computer processors and stored on at least one of the one or more storage devices, the program instructions comprising:
- program instructions to display a first subset of data entries from the group of data entries within a display window of the user interface, wherein the group of data entries contains more data entries than can fit within the display window;
- program instructions to determine that a second subset of data entries from the group of data entries will not fit within the display window of the user interface concurrently with the first subset of data entries;
- program instructions to, responsive to determining that the second subset of data entries will not fit within the display window of the user interface concurrently with the first subset of data entries, generate and display a marker representative of the second subset of data entries, wherein the marker is displayed within the display window of the user interface with the first subset of data entries; and
- program instructions to manipulate the data entries in the second subset of data entries based on an operation request directed at the marker representative of the second subset of data entries.

10. The computer program product of claim 9, wherein the second subset of data entries contains one or more data entries from the group of data entries not included in the first subset of data entries.

11. The computer program product of claim 9, wherein the second subset of data entries contains all data entries, from the group of data entries, not included in the first subset of data entries.

12. The computer program product of claim 9, wherein the marker representative of the second subset of data entries is a line of text.

13. The computer program product of claim 9, wherein the marker representative of the second subset of data entries of a graphical icon.

14. The computer program product of claim 9, further comprising program instructions, for execution by one or more computer processors and stored on at least one of the one or more storage devices, to manipulate the data entries in the first subset of data entries based on the operation request directed at the marker representative of the second subset of data entries.

15. The computer program product of claim 9, wherein the program instructions to manipulate the data entries of the second subset comprises one or more of: program instructions to alter the data entries, program instructions to edit the data entries, program instructions to move the data entries, program instructions to organize the data entries, program instructions to use the data entries in a subsequent operation, program instructions to use respective fields within the data entries in a subsequent operation, and program instructions to use the data entries to determine a response to a query where the operation request directed at the marker is the query.

16. The computer program product of claim 9, further comprising program instructions, for execution by one or more computer processors and stored on at least one of the one or more storage devices, to:
- receive a selection of the marker from a user;
- receive the operation request from the user; and
- determine that the operation request is directed at the marker by receiving the selection of the marker from the user and subsequently receiving the operation request from the user.

17. A computer system for manipulating one or more data entries from a group of data entries in a user interface, the computer system comprising:
- one or more processors, one or more computer-readable memories, one or more computer-readable tangible storage devices and program instructions which are stored on the one or more storage devices for execution by the one or more processors via the one or more memories, the program instructions comprising:
- program instructions to display a first subset of data entries from the group of data entries within a display window of the user interface, wherein the group of data entries contains more data entries than can fit within the display window;
- program instructions to determine that a second subset of data entries from the group of data entries will not fit within the display window of the user interface concurrently with the first subset of data entries;
- program instructions to, responsive to determining that the second subset of data entries will not fit within the display window of the user interface concurrently with the first subset of data entries, generate and display a marker representative of the second subset of data entries, wherein the marker is displayed within the display window of the user interface with the first subset of data entries; and
- program instructions to manipulate the data entries in the second subset of data entries based on an operation request directed at the marker representative of the second subset of data entries.

18. The computer system of claim 17, wherein the second subset of data entries contains one or more data entries from the group of data entries not included in the first subset of data entries.

19. The computer system of claim 17, wherein the second subset of data entries contains all data entries, from the group of data entries, not included in the first subset of data entries.

20. The computer system of claim 17, wherein the marker representative of the second subset of data entries is a line of text.

21. The computer system of claim 17, wherein the marker representative of the second subset of data entries of a graphical icon.

22. The computer system of claim 17, further comprising program instructions, stored on at least one of the one or more storage devices for execution by at least one of the one or more processors via at least one of the one or more memories, to manipulate the data entries in the first subset of data entries based on the operation request directed at the marker representative of the second subset of data entries.

23. The computer system of claim 17, wherein the program instructions to manipulate the data entries of the second subset comprises one or more of: program instructions to alter the data entries, program instructions to edit the data entries, program instructions to move the data entries, program instructions to organize the data entries, program instructions to use the data entries in a subsequent operation, program instructions to use respective fields within the data entries in a subsequent operation, and program instructions to use the data entries to determine a response to a query where the operation request directed at the marker is the query.

* * * * *